(12) United States Patent
Yoshida

(10) Patent No.: US 7,526,251 B2
(45) Date of Patent: Apr. 28, 2009

(54) COMMUNICATION APPARATUS AND CONTROL METHOD THEREOF

(75) Inventor: Masashi Yoshida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 474 days.

(21) Appl. No.: 11/518,271

(22) Filed: Sep. 11, 2006

(65) Prior Publication Data

US 2007/0060213 A1 Mar. 15, 2007

(30) Foreign Application Priority Data

Sep. 12, 2005 (JP) ............................. 2005-264425

(51) Int. Cl.
*H04B 1/16* (2006.01)
*H04B 1/38* (2006.01)

(52) U.S. Cl. .................. 455/39; 455/127.5; 455/343.1; 455/574; 348/333.13; 370/311

(58) Field of Classification Search ............. 455/127.5, 455/343.1–343.3, 574; 348/333.13, 372; 370/311

See application file for complete search history.

(56) References Cited

U.S. PATENT DOCUMENTS

| | | | | |
|---|---|---|---|---|
| 6,067,297 A | * | 5/2000 | Beach | 370/389 |
| 6,604,201 B1 | * | 8/2003 | Takahashi et al. | 713/323 |
| 6,823,284 B2 | | 11/2004 | Gfellar et al. | 702/176 |
| 6,917,598 B1 | * | 7/2005 | Emeott et al. | 370/311 |
| 2003/0071912 A1 | * | 4/2003 | Minakuti | 348/372 |
| 2005/0259836 A1 | * | 11/2005 | Yeh | 381/124 |
| 2006/0039345 A1 | * | 2/2006 | Perez-Costa | 370/346 |
| 2007/0184880 A1 | * | 8/2007 | Frank | 455/574 |

* cited by examiner

*Primary Examiner*—Simon D Nguyen
(74) *Attorney, Agent, or Firm*—Fitzpatrick, Cella, Harper & Scinto

(57) ABSTRACT

A digital camera 210 and a printer 220 mutually determine if each other supports PS mode. If both of them support PS mode, these two apparatuses form a network for PS by themselves and wirelessly communicate with PS mode enabled. If at least one of them does not support PS mode, normal wireless communication is performed with PS mode disabled.

13 Claims, 16 Drawing Sheets

COMMUNICATION APPARATUS AND CONTROL METHOD THEREOF

BACKGROUND OF THE INVENTION

1. Field of the Invention

The present invention relates to a communication apparatus and control method thereof, and more particularly to a communication apparatus that wirelessly communicates in power save mode in an adhoc network and control method thereof.

2. Description of the Related Art

In recent years, owing to the integration of devices for wireless communication, not only portable personal computers (so-called notebook PCs), but also various other devices, such as printers, personal digital assistants (PDAs), digital cameras, cellular phones, etc. have come to be equipped with wireless communication capability. In these wireless communication apparatuses, since smaller apparatuses equate to smaller capacities of battery which can be included, there is a growing need to reduce power consumption in wireless communication.

As a function for reducing power consumption in wireless LAN communication, power save mode (hereinafter also referred to as "PS model") is defined in the IEEE802.11 standard. The basic principle of PS mode is that a wireless receiver is powered to be operated for a short period at and around the time when a beacon is expected to be transmitted, but power feeding to the wireless receiver is cut for the remaining period, thereby reducing power consumption.

In wireless communication in an infrastructure network, a station (which means a wireless communication apparatus and is hereinafter also referred to as "STA") only receives beacons transmitted by an access point (hereinafter also referred to as "AP"). The station looks into a TIM (traffic indication map) contained in the received beacon, and determines if any data destined for it is buffered in the AP. If there is data destined for the station, the STA continues to feed power to the wireless transceiver, and transmits a PS-Poll packet to the AP.

When the AP receives the PS-Poll packet, it determines that the source STA (the STA that transmitted the PS-Poll packet) is ready to receive data (Awake) and transmits the buffered data in packet format to the STA. Upon receipt of the data packet, the STA immediately transmits to the AP an LACK packet that means completion of receipt.

The STA determines if more data is buffered in the AP in addition to the received packet by looking at a More Data flag included in the MAC header of the received packet. If the STA receives a packet with its More Data flag set to 1, it stays Awake. If the STA receives a packet with its More Data flag set to 0, it cuts power feeding to the wireless transceiver and shifts to a state where it cannot transmit and receive any data (Doze).

On the other hand, in wireless communication in an adhoc network, stations directly communicate with each other, and thus there is no AP which is always Awake. In such a case, at a destination STA to which a source STA is communicating, if power save mode is enabled (ON), the destination STA may be in the Awake or the Doze state, depending upon the timing of data transmission. If the destination STA is in the Doze state when data is transmitted, the destination STA cannot receive the data and packet loss may occur. Therefore, it is desirable that the source STA detects whether the PS mode of the destination STA is enabled or disabled.

For the method for detecting the PS mode of an STA, no specification is found in the IEEE802.11 standards. As a general method, however, an STA determines the PS mode of its partner STA by reference to a Power Management bit (PM bit) contained in the MAC header of a packet transmitted by the partner STA.

Therefore, the STA stores and updates the MAC address and PS mode for each STA by making use of beacons, etc. transmitted by other STAs participating in the adhoc network.

FIG. 1 illustrates a packet sequence where the power save mode of wireless communication apparatuses is enabled in an adhoc network. As shown in FIG. 1, if STA 2 transmits data to STA 3, for example, STA 2 transmits an ATIM packet to STA 3 within an ATIM Window in a beacon interval where all the STAs are Awake. This allows STA 3 to stay Awake during the beacon interval and STA 2 can transmit a data packet to STA 3.

If the ATIM Window is set to a value of 0 when the adhoc network is generated, there will be no ATIM Window period in the beacon interval, and thus power save mode cannot be enabled. Therefore, if the power save mode is enabled in the adhoc network, the ATIM Window must be set to a value of 1 or above when generating the network. It should be noted that when ATIM Window is used herein as a variable, the value indicates an ATIM Window period.

As described above, in order for one STA to participate and communicate in an adhoc network where STAs for which power save mode is enabled may exist, it must keep track of whether the power save mode of each of the STAs is enabled or disabled. For this purpose, the states of the PM bits contained in the packets of beacons, etc. transmitted by the STAs are detected. Then, the detected results are stored for each of the MAC addresses of the STAs, and are updated whenever necessary upon receipt of a packet.

However, because the method for detecting PS mode is not specified in the IEEE802.11 standard, there is no guarantee that the other STAs in communication perform the control as described above. Accordingly, when one STA has power save mode enabled and is in the Doze state, if another (partner) STA transmits a data packet to the STA, it may fail to receive the data packet. If the packet is an ARP packet which is issued when an IP address is assigned, a conflict of IP addresses may occur and adversely affect on the overall network.

The present invention has been made in view of the foregoing situation, and is characterized by providing technologies to prevent an STA from failing to receive packets transmitted by the other STAs on the network to which the STA belongs, even when PS mode of the STA is enabled.

SUMMARY OF THE INVENTION

It is a feature of the present invention to solve the conventional problems.

According to an aspect of the present invention, there is provided with a communication apparatus capable of wirelessly communicating in power save mode, comprising:

a first connection unit for connecting to a first network using first wireless parameters, a detection unit for detecting whether or not a predetermined external apparatus included in the first network supports wireless communication in the power save mode, a transmission unit for transmitting to the external apparatus second wireless parameters for connecting to a second network different from the first network being comprised of the external apparatus and the communication apparatus and a network switching request to connect to the second network using the second wireless parameters, if it is detected by the detection unit that the external apparatus supports wireless communication in the power save mode, and a second connection unit for connecting to the second network instead of the first network using the second wireless parameters, wherein the communication apparatus wirelessly communicates in the power save mode with the external apparatus in the second network.

According to another aspect of the present invention, there is provided with a method for controlling a communication apparatus capable of wirelessly communicating in power save mode, comprising:

a first connection step of connecting to a first network using first wireless parameters, a detection step of detecting whether or not a predetermined external apparatus included in the first network supports wireless communication in the power save mode, a transmission step for transmitting to the external apparatus second wireless parameters for connecting to a second network different from the first network being comprised of the external apparatus and the communication apparatus and a network switching request to connect to the second network using the second wireless parameters, if it is detected in the detection step that the external apparatus supports wireless communication in the power save mode, a second connection step for connecting to the second network instead of the first network using the second wireless parameters, and a communication step of wirelessly communicating in the power save mode with the external apparatus in the second network.

According to another aspect of the present invention, there is provided with a program, stored in a computer-readable storage medium, for causing a computer to execute a method for controlling a communication apparatus capable of wirelessly communicating in power save mode, comprising:

a first connection step of connecting to a first network using first wireless parameters, a detection step of detecting whether or not a predetermined external apparatus included in the first network supports wireless communication in the power save mode, a transmission step for transmitting to the external apparatus second wireless parameters for connecting to a second network different from the first network being comprised of the external apparatus and the communication apparatus and a network switching request to connect to the second network using the second wireless parameters, if it is detected in the detection step that the external apparatus supports wireless communication in the power save mode, a second connection step for connecting to the second network instead of the first network using the second wireless parameters, and a communication step of wirelessly communicating in the power save mode with the external apparatus in the second network.

This summary of the invention does not necessarily describe all necessary features so that the invention may also be a sub-combination of these described features.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention are described below with reference to the accompanying drawings. The specific embodiments described below will help understand various concepts, such as superordinate concept, mid-level concept, and subordinate concept.

It should be noted that the technical scope of the present invention should not be limited by the specific embodiments described below, but should be defined by the claims. Also, not all the combinations of the features described in the embodiments are necessary for the solution of the present invention.

First Embodiment

<Structure of Adhoc Network>

Figure 1:
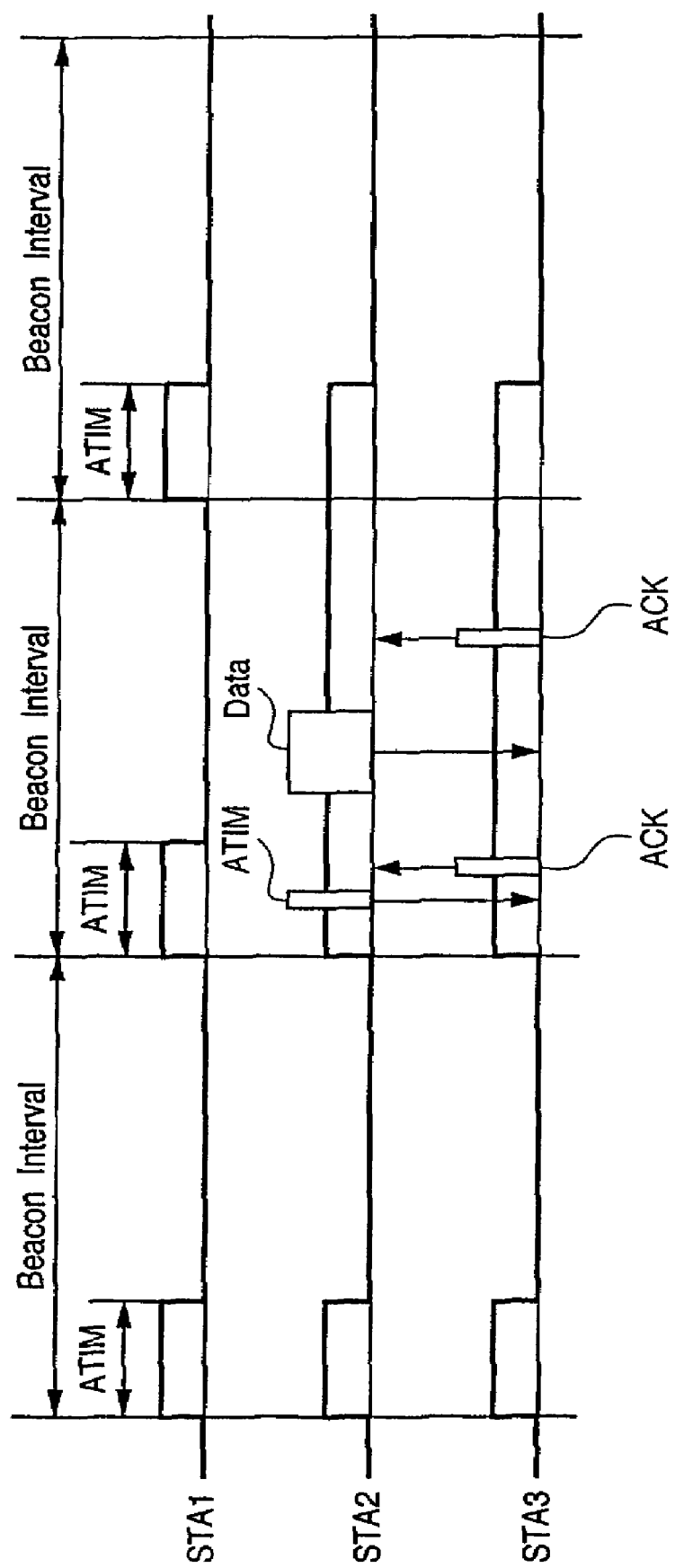
FIG. 1 illustrates a packet sequence where the power save mode of wireless communication apparatuses is enabled in an adhoc network.
Figure 2:
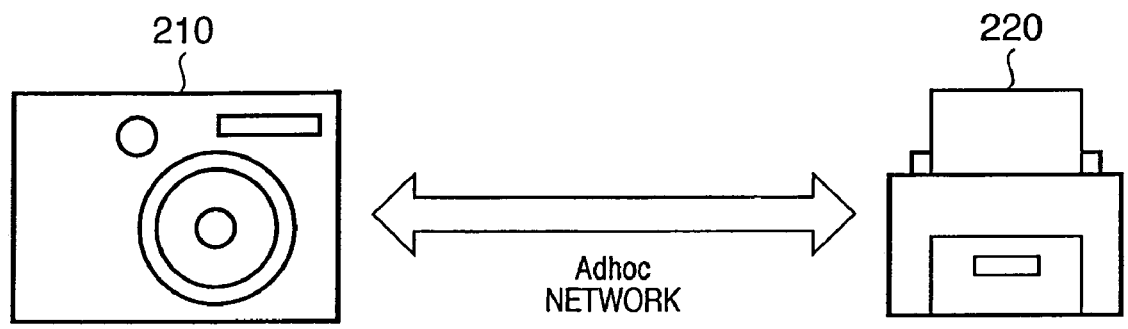
FIG. 2 illustrates an example of an adhoc network comprised of a digital camera and a printer, which are communication apparatuses in a first embodiment.

FIG. 2 illustrates an example of an adhoc network comprised of a digital camera 210 and a printer 220, which are communication apparatuses in a first embodiment.

The digital camera 210 and the printer 220 are provided with wireless communication capability, respectively, and transmit and receive various types of data using adhoc communication, which is a method for communicating without going through an AP.

It should be noted that there may be some other wireless communication apparatuses than the digital camera 210 and the printer 220 in this adhoc network. However, as described later, when the digital camera 210 and the printer 220 actually transmit and receive data, another adhoc network in which no other wireless communication apparatus exists is formed.

<Configuration of Digital Camera 210 and Printer 220>

Figure 3:
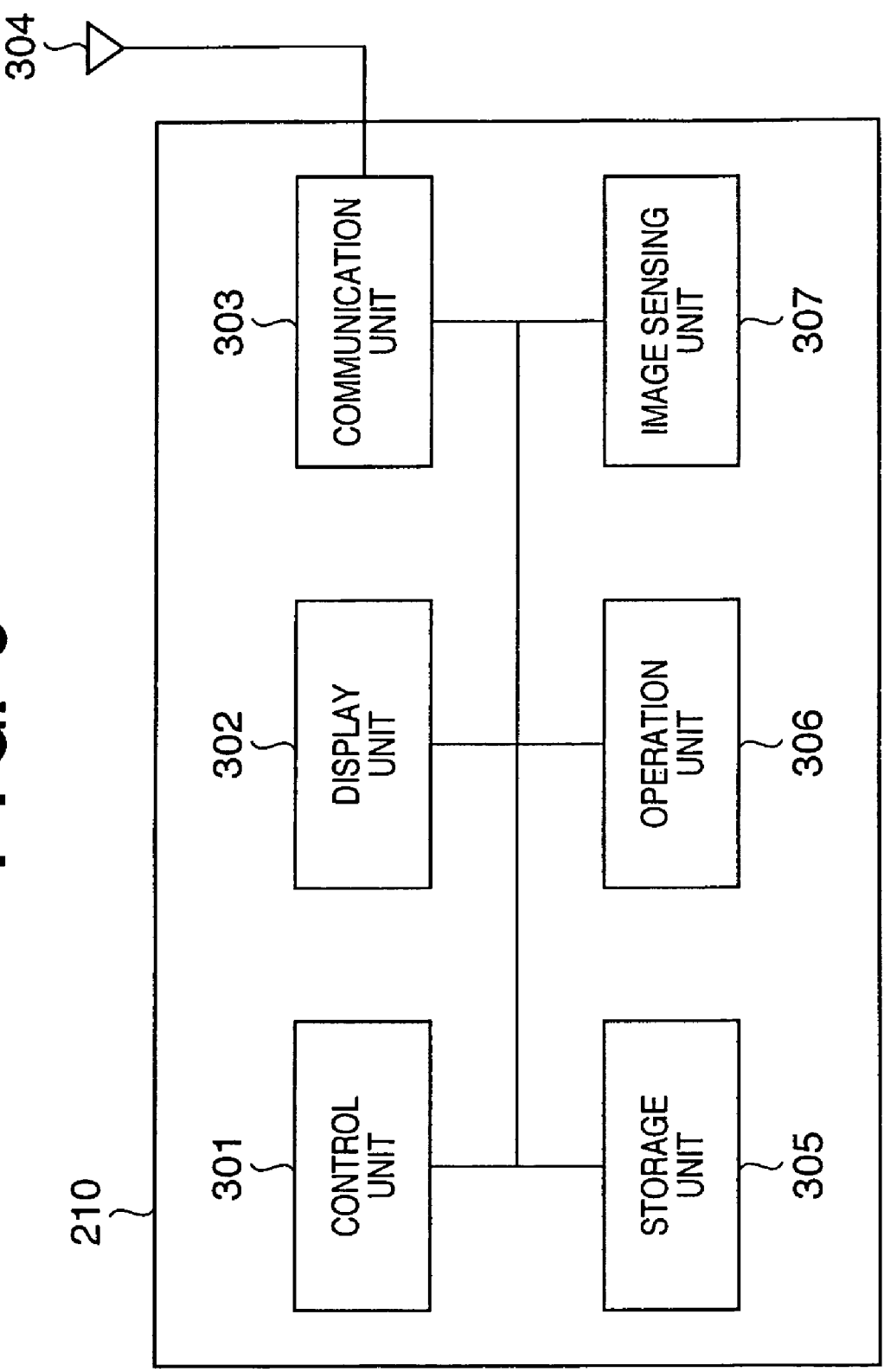
FIG. 3 is a functional block diagram illustrating the hardware configuration of the digital camera.

FIG. 3 is a functional block diagram of the hardware configuration of the digital camera 210.

A control unit 301 includes a flash ROM and a RAM, which are not shown, and controls the whole digital camera 210 by executing a program (firmware) stored in the flash ROM. The control of the whole digital camera 210 includes control of enabling/disabling PS mode.

A display unit 302 consists of, for example, a liquid crystal display. The display unit 302 may display a captured image or a menu screen, or may function as an electronic viewfinder.

A communication unit 303 is an interface for wirelessly communicating with other wireless communication apparatuses.

An antenna 304 transmits and receives radio waves in wireless communication. The antenna 304 may be external or internal to the digital camera 210.

A storage unit 305 is a rewritable storage medium, such as an SRAM or a HDD (hard disk drive). The storage unit 305 stores various types of data including, for example, parameters for wireless communication such as an ESS-ID and an encryption key (hereinafter referred to as "wireless parameters") and setting information for the digital camera 210.

An operation unit 306 consists of, for example, a shutter button, a cross key and a menu button. Through this unit, a user can provide the digital camera 210 with various kinds of instructions, such as those for setting to PS mode or imaging.

An image sensing unit 307 consists of an optical lens, a solid-state image sensing element, an A/D converter and so forth and obtains image data.

Figure 4:
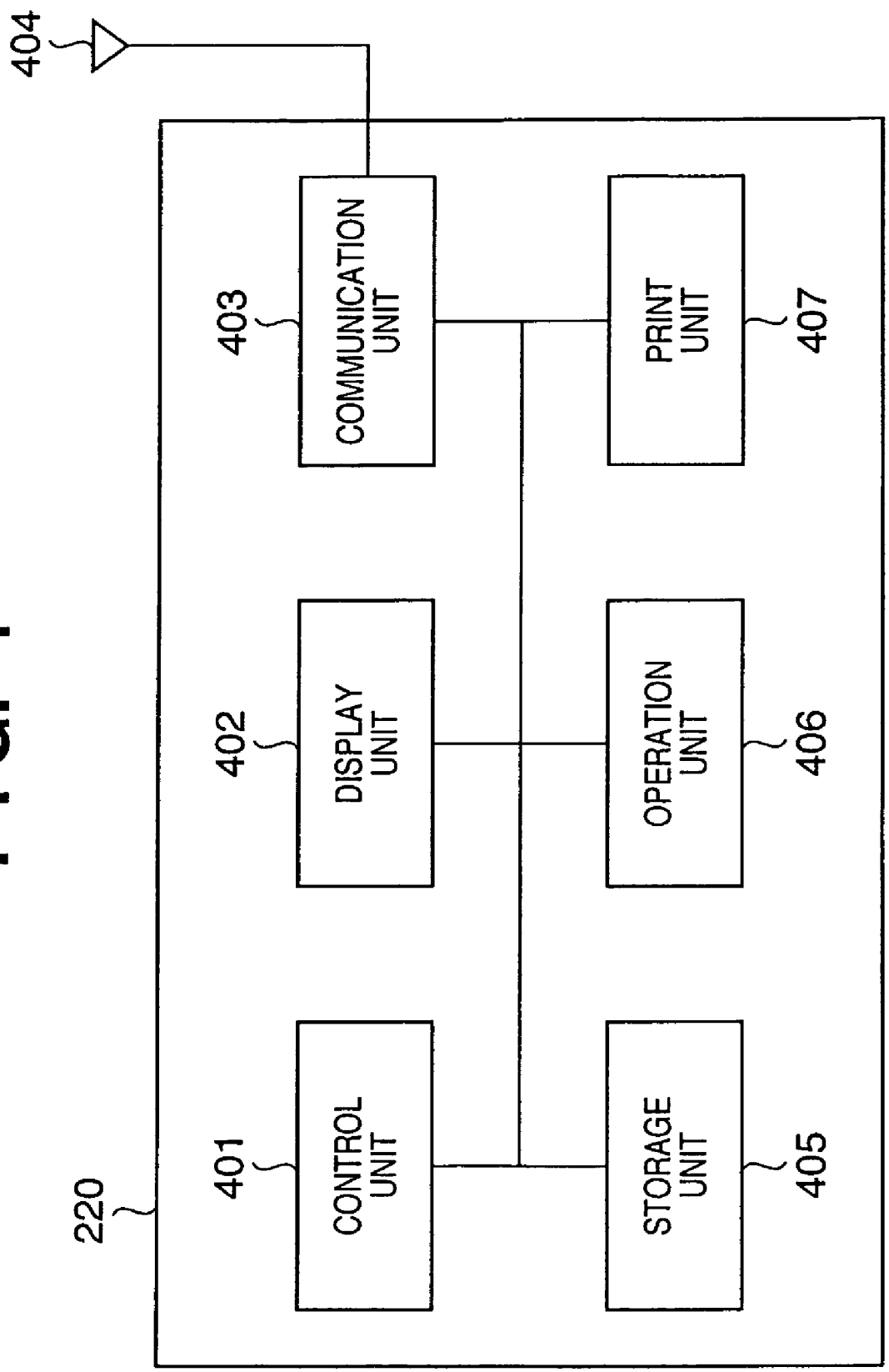
FIG. 4 is a functional block diagram illustrating the hardware configuration of the printer.

FIG. 4 is a functional block diagram illustrating the hardware configuration of the printer 220.

A control unit 401 includes a flash ROM and a RAM, which are not shown, and controls the whole printer 220 by executing a program (firmware) stored in the flash ROM. The control of the whole printer 220 includes control of enabling/disabling PS mode.

A display unit 402 consists of, for example, a liquid crystal display. The display unit 402 displays the status of the printer 220 or an image being printed.

A communication unit 403 is an interface for wirelessly communicating with other wireless communication apparatuses.

An antenna 404 transmits and receives radio waves in wireless communication. The antenna 404 may be external or internal to the printer 220.

A storage unit 405 is a rewritable storage medium, such as an SRAM or a HDD (hard disk drive). The storage unit 405 stores various types of data, such as wireless parameters or setting information of the printer 220.

An operation unit 406 consists of a menu button, a print stop button and so forth. Through this a user can provide the printer 220 with various kinds of instructions, such as those for setting to PS mode or forced termination of printing.

A print unit 407 consists of a printhead, an ink cartridge and so forth, and prints an image or the like on a medium (such as a piece of paper). It should be noted that the printer 220 is not limited to an ink jet printer, but may be a laser printer, for example.

<Outline of Network>

Figure 5:
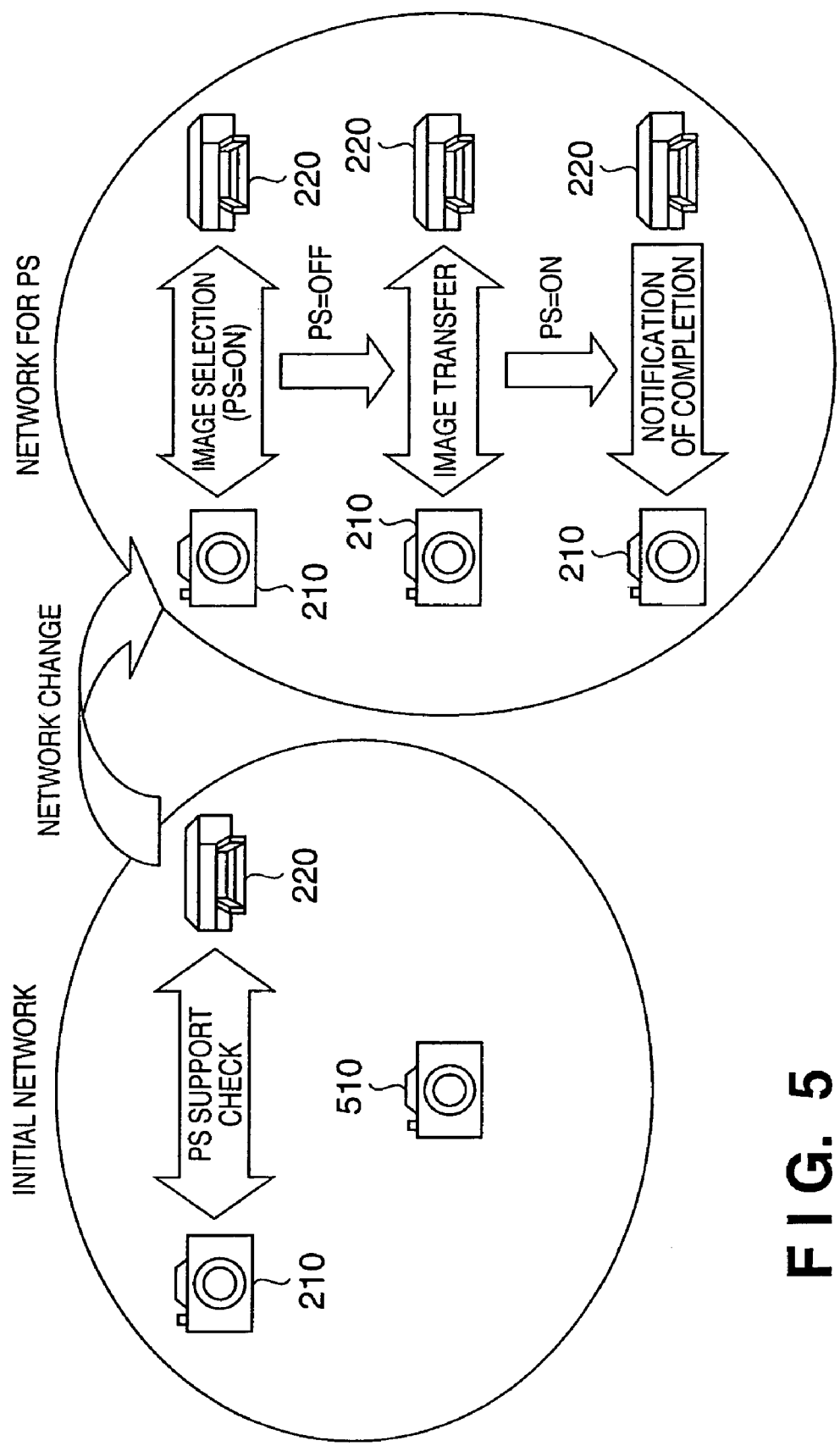
FIG. 5 illustrates an outline of the adhoc network in the first embodiment.

FIG. 5 shows an outline of the adhoc network in the present embodiment. As described above, the initial adhoc network (initial network) including the digital camera 210 and the printer 220 may also include other wireless communication apparatuses such as a digital camera 510. The digital camera 510 may or may not support PS mode.

The digital camera 210 and the printer 220 mutually make sure that each other supports PS mode, and then break away from the initial network and newly form a network for PS. Although the network for PS is also a kind of adhoc network, it is a network in which no other wireless communication apparatus is present and data is transmitted and received solely between the digital camera 210 and the printer 220.

In the network for PS, the digital camera 210 and the printer 220 can arbitrarily enable or disable. PS mode. To be brief, it is preferable that PS mode is enabled in principle and is disabled when large data such as image is transmitted and received, as described later in detail.

<Flow of Processing>

FIGS. 6A to 6E are flow charts illustrating the flows of processing in which the digital camera 210 and the printer 220 form a network for PS and transmit and receive data. In these flow charts, the operations performed by the digital camera 210 and the printer 220 are provided in parallel.

In these flow charts, the description is given based on an assumption that the digital camera 210 transmits image data to the printer 220, and the printer 220 performs so-called direct print. However, the types of data actually transmitted and received are not limited to this, and what is important is that the digital camera 210 and the printer 220 can wirelessly communicate with PS mode enabled, as appropriate.

Figure 6A:
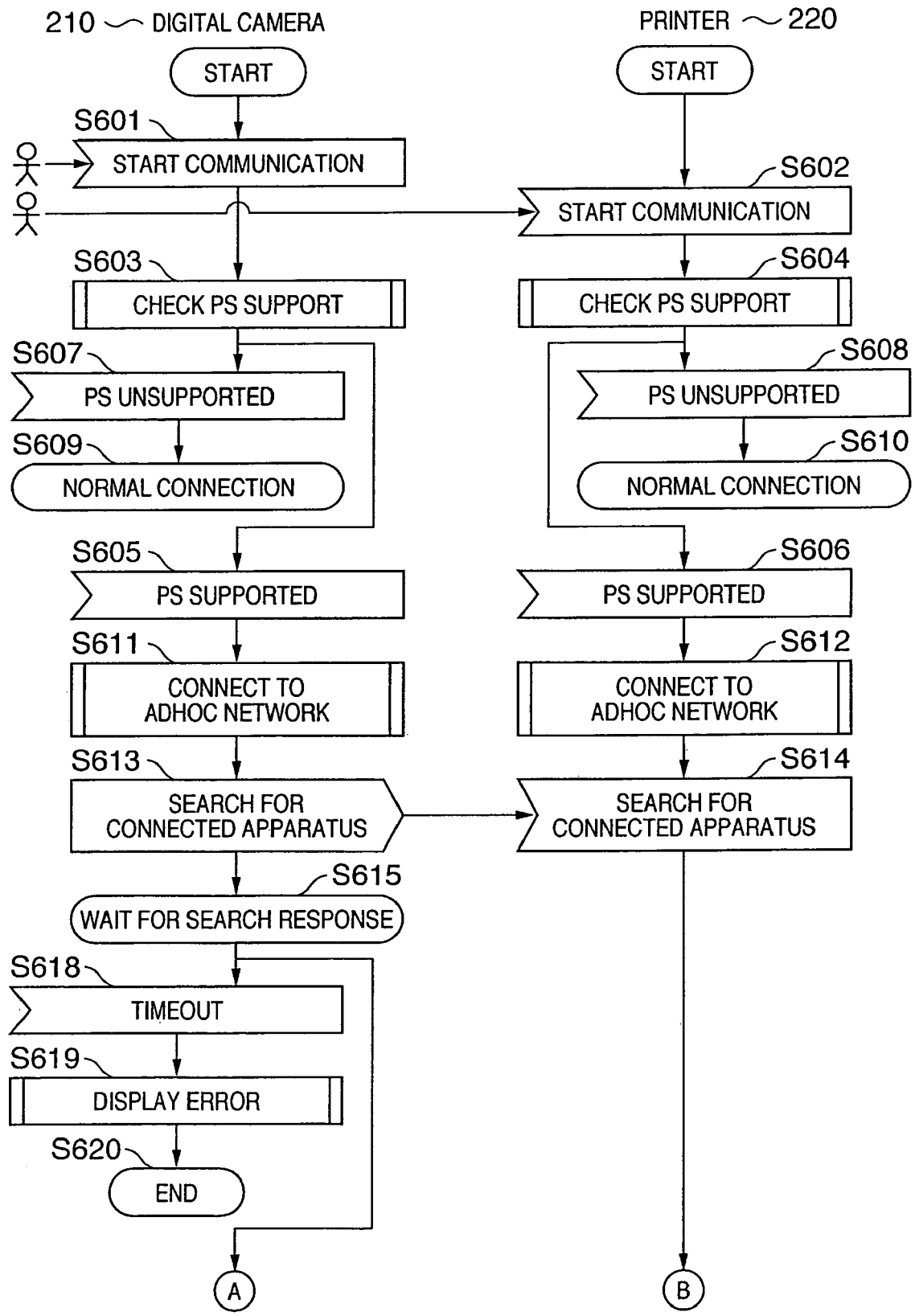
FIGS. 6A to 6E are flow charts illustrating the flows of processing in which the digital camera and the printer form a network for PS and transmit and receive data in the first embodiment.

In step S601 in FIG. 6A, the control unit 301 of the digital camera 210 waits for an instruction to start wireless communication to be received via the operation unit 306 from a user. In parallel with step S601, in step S602, the control unit 401 of the printer 220 waits for an instruction to start wireless communication to be received via the operation unit 406 from a user. It is assumed that at this time the printer 220 is designated as the communication partner of the digital camera 210, and the digital camera 210 is designated as the communication partner of the printer 220 by the user.

It should be noted that wireless parameters used by the digital camera 210 and the printer 220 to connect to the adhoc network and information about whether the communication partner to which they are to communicate supports the PS mode of the present invention are previously stored in the storage unit 305 and the storage unit 405. Since the wireless parameters need to match with each other, they are pre-set, for example, in factories at the time of shipment of the digital camera 210 and the printer 220. When wireless communication apparatuses are newly purchased, the wireless parameters, together with the information about whether the respective apparatuses support PS mode, may also be set by the user to match with each other through the operation units of the respective apparatuses.

More specifically, the digital camera 210 maintains, for example, one or more tables consisting of items (registration number, MAC address, ESS-ID, encryption key, PS enabled/disabled), and one of the tables corresponds to the printer 220. In the item "MAC address," the MAC address of the printer 220 is registered. Because of this, the digital camera 210 can uniquely identify the printer 220. The configuration of this table is not limited to the above, but any configuration may be used if only it includes wireless parameters and can uniquely identify the communication partner. The ESS-ID in the table may also be used in an initial network in which PS mode is disabled, and is made up of a relatively simple character string so that wireless communication apparatuses other than the digital camera 210 and the printer 220 can participate with ease. Therefore, even if the digital camera 210 and the printer 220 could uniquely identify each other in steps S601 and S602, it is not preferable for them to comprise a network for PS from the beginning. Thus, as described later, it is preferable that the digital camera 210 and the printer 220 first connect to an initial network, and then shift to a network for PS.

In step S603, the control unit 301 of the digital camera 210 determines if the printer 220 supports PS mode with reference to the information recorded in the storage unit 305. If it does, the process proceeds to steps S605 and S611. If not, since enabling PS mode will prevent the printer 220 from successfully communicating, the process proceeds to steps S607 and S609, and normal communication is performed with PS mode disabled.

In step S604, the control unit 401 of the printer 220 determines if the digital camera 210 supports PS mode with reference to the information recorded in the storage unit 405. If it does, the process proceeds to steps S606 and S612. If not, since enabling PS mode will prevent the digital camera 210 from successfully communicating, the process proceeds to steps S608 and S610, and normal communication is performed with PS mode disabled.

It should be noted that another configuration is also possible in which the information about whether the digital camera 210 and the printer 220 support PS mode is not previously recorded in the storage unit 305 and the storage unit 405. In this case, after the digital camera 210 and the printer 220 connect to the initial network as described below, they transmit and receive the information about whether they supports PS mode to and from each other to determine whether they are ready for PS mode.

In step S611, the control unit 301 of the digital camera 210 connects to the adhoc network (initial network) using wireless parameters recorded in the storage unit 305. At this time, ATIM Window is set to ATIM Window=0 and the PS mode of the digital camera 210 is disabled. Even if there are some other wireless communication apparatuses in the initial network which do not support PS mode, this can prevent the digital camera 210 from failing to receive packets transmitted from those apparatuses.

In step S612, the control unit 401 of the printer 220 connects to the initial network using wireless parameters recorded in the storage unit 405. At this time, ATIM Window is set to ATIM Window=0 and the PS mode of the printer 220 is disabled. This has the same effect as in step S611.

In step S613, the control unit 301 of the digital camera 210 searches for the printer 220 in the initial network and in step S615 waits for a response packet from the printer 220 to come. In the search here, any well known technique, such as UPnP (Universal Plug and Play) or Bonjour, may be used. When the digital camera 210 receives the response packet from the printer 220, the process proceeds to step S616 and S621 in FIG. 6B. If a predetermined time has elapsed without receiving the response packet (timeout), the process proceeds to steps. S618 and S619, the control unit 301 causes the display unit 302 to display an error message, and the process ends.

In parallel with step S613, in step S614, the control unit 401 of the printer 220 searches for the digital camera 210 in the initial network. More specifically, it waits for a search packet to be received from the digital camera 210, and when the packet is received, in step S617 in FIG. 6B, it returns a response packet to the digital camera 210.

Figure 6B:
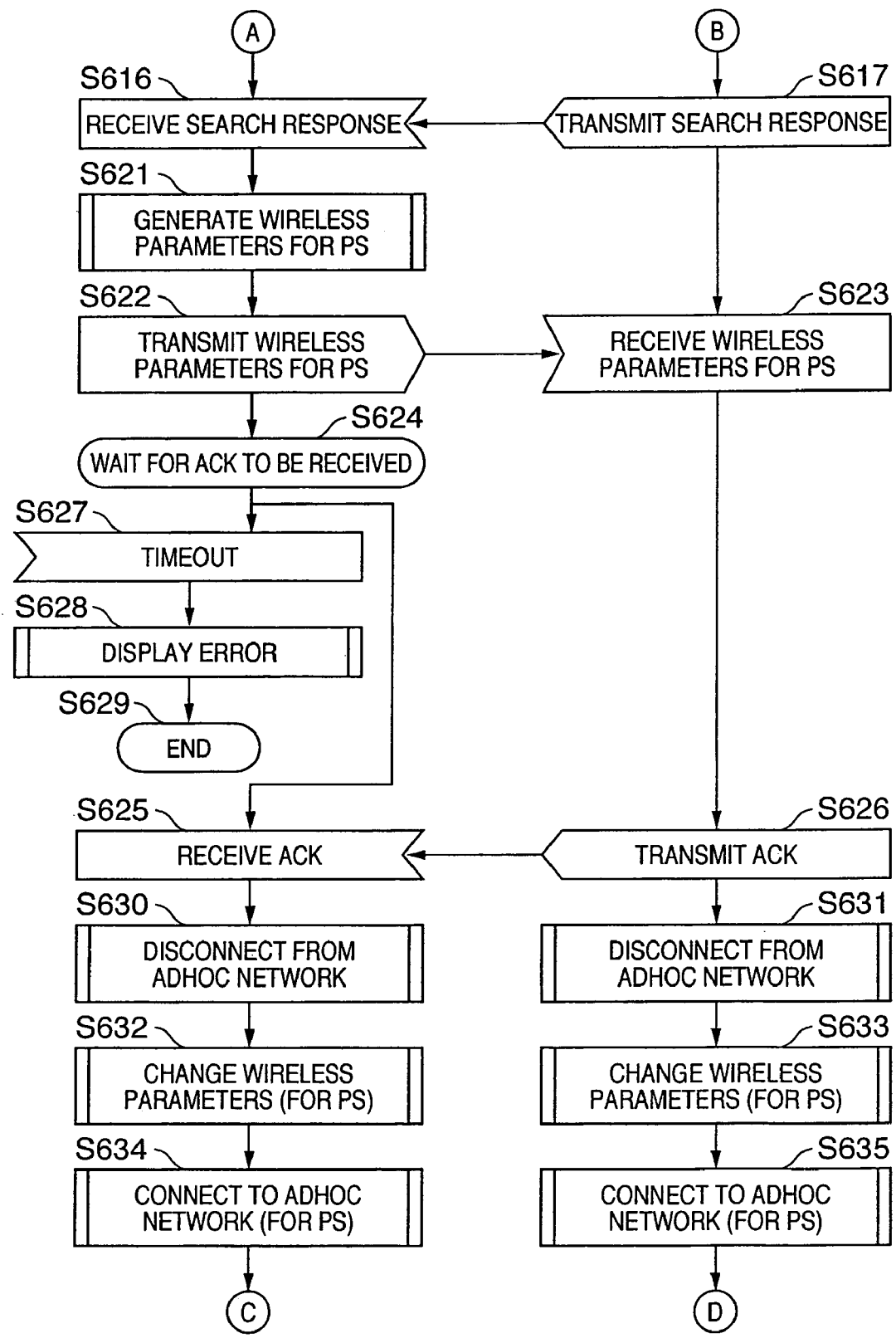
Figure 6C:
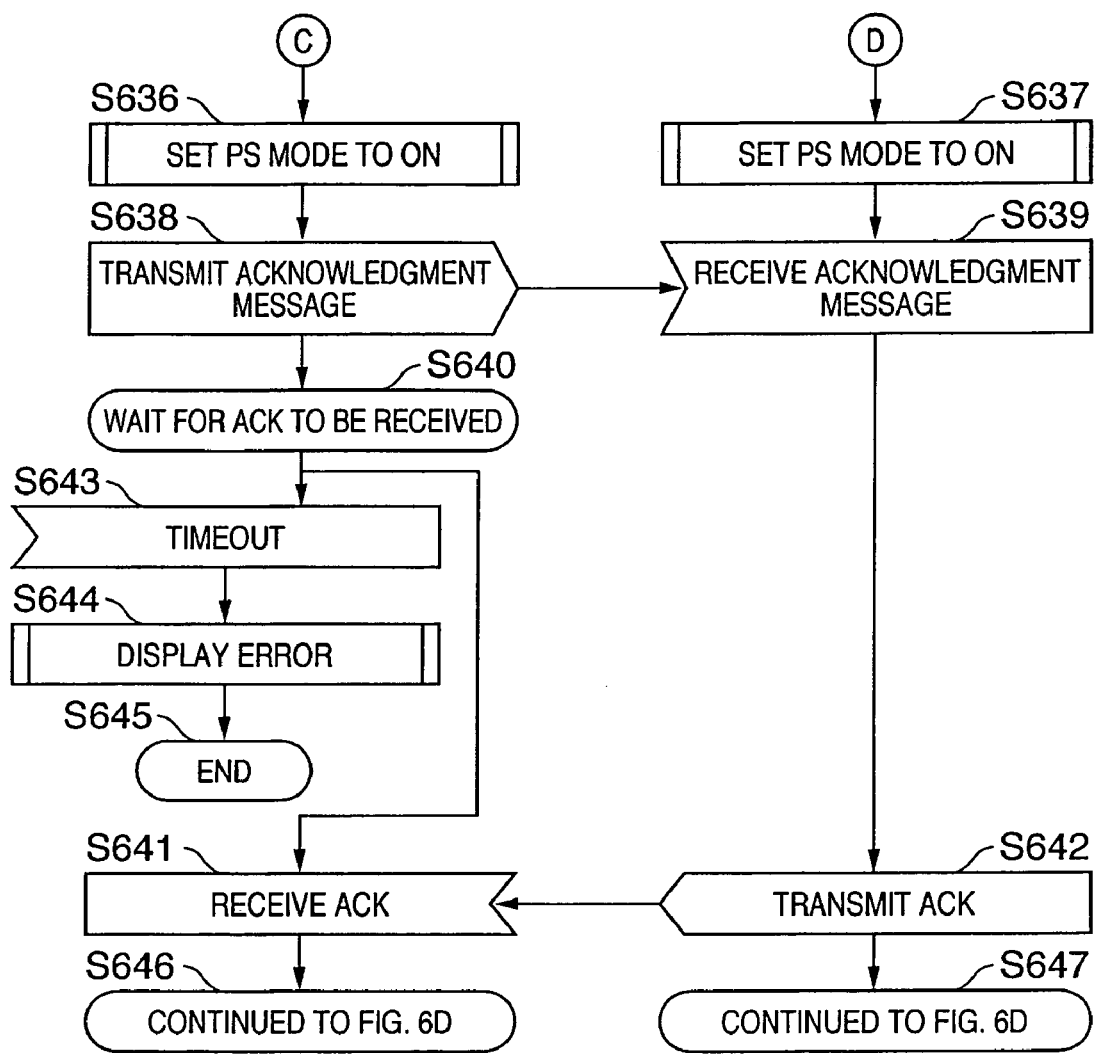

In step S621 in FIG. 6B, the control unit 301 of the digital camera 210 generates wireless parameters for the network for PS (see FIG. 5). The generated wireless parameters are recorded, for example, in the storage unit 305. The wireless parameters are generated randomly using, for example, a product ID or a serial number of the digital camera 210, or a current time as a seed. It should be noted that any algorithm may be used for the generation algorithm of the wireless parameters if only it can create a unique value. Alternatively, the printer 220, instead of the digital camera 210, may also be configured to generate the wireless parameters.

In step S622, the control unit 301 of the digital camera 210 transmits the wireless parameters generated in step S621 to the printer 220.

In step S623, the control unit 401 of the printer 220 receives the wireless parameters transmitted from digital camera 210. The received wireless parameters are recorded, for example, in the storage unit 405. Then, in step S626, the control unit 401 of the printer 220 transmits an ACK packet to the digital camera 210.

In step S624, the control unit 301 of the digital camera 210 waits for the ACK packet to be received from the printer 220. If the ACK packet is received, the process proceeds to steps S625 and S630. If a predetermined time has elapsed without receiving the response packet (timeout), the process proceeds to steps S627 and S628, the control unit 301 causes the display unit 302 to display an error message, and the process ends.

In this way, by transmitting and receiving the ACK packet, it can be ensured that the wireless parameters have been transmitted from the digital camera 210 to the printer 220.

In step S630, the control unit 301 of the digital camera 210 disconnects the digital camera 210 from the initial network.

In step S631, the control unit 401 of the printer 220 disconnects the printer 220 from the initial network.

In step S632, the control unit 301 of the digital camera 210 changes the wireless parameters used by the digital camera 210 to those generated in step S621.

In step S633, the control unit 401 of the printer 220 changes the wireless parameters used by the printer 220 to those received in step S623.

In steps S634 and S635, the control unit 301 of the digital camera 210 and the control unit 401 of the printer 220 form an adhoc network (network for PS) with the changed wireless parameters. At this time, ATIM Window is set to a value of 1 or above. In this network for PS, no wireless communication apparatus other than the digital camera 210 and the printer 220 is present as described above. Then the process proceeds to steps S636 and S637 in FIG. 6C.

In step S636, the control unit 301 of the digital camera 210 enables the PS mode of the digital camera 210.

In step S637, the control unit 401 of the printer 220 enables the PS mode of the printer 220.

In step S638, the control unit 301 of the digital camera 210 transmits a acknowledgment message to the printer 220.

In step S639, the control unit 401 of the printer 220 receives the acknowledgment message transmitted from the digital camera 210. Then, in step S642, the control unit 401 of the printer 220 transmits an ACK packet to the digital camera 210.

In step S640, the control unit 301 of the digital camera 210 waits for the ACK packet to be received from the printer 220. If the ACK packet is received, the process proceeds to steps S641 and S646. If a predetermined time has elapsed without receiving the response packet (timeout), the process proceeds to step S643 and S644, the control unit 301 causes the display unit 302 to display an error message, and the process ends.

In this way, by transmitting and receiving the ACK packet, it can be ensured that the digital camera 210 and the printer 220 have successfully shifted from the initial network to the network for PS.

According to the above described processing, if both of the digital camera 210 and the printer 220 support PS mode, these two apparatuses can form a network for PS by themselves and transmit and receive data with PS mode enabled.

It should be noted that, in this embodiment, the description is provided based on the assumption that the digital camera 210 and the printer 220 connect to the initial network at about the same time (see steps S611 and S612 in FIG. 6A). In fact, however, one apparatus may have participated in the initial network earlier than the other. For example, first, the printer 220 and a PC not shown may be connected to an initial network, and then the digital camera 210 may connect to (participate in) the initial network and shift to a network for PS together with the printer 220 according to step S613 in FIG. 6A and the subsequent processing.

Figure 6D:
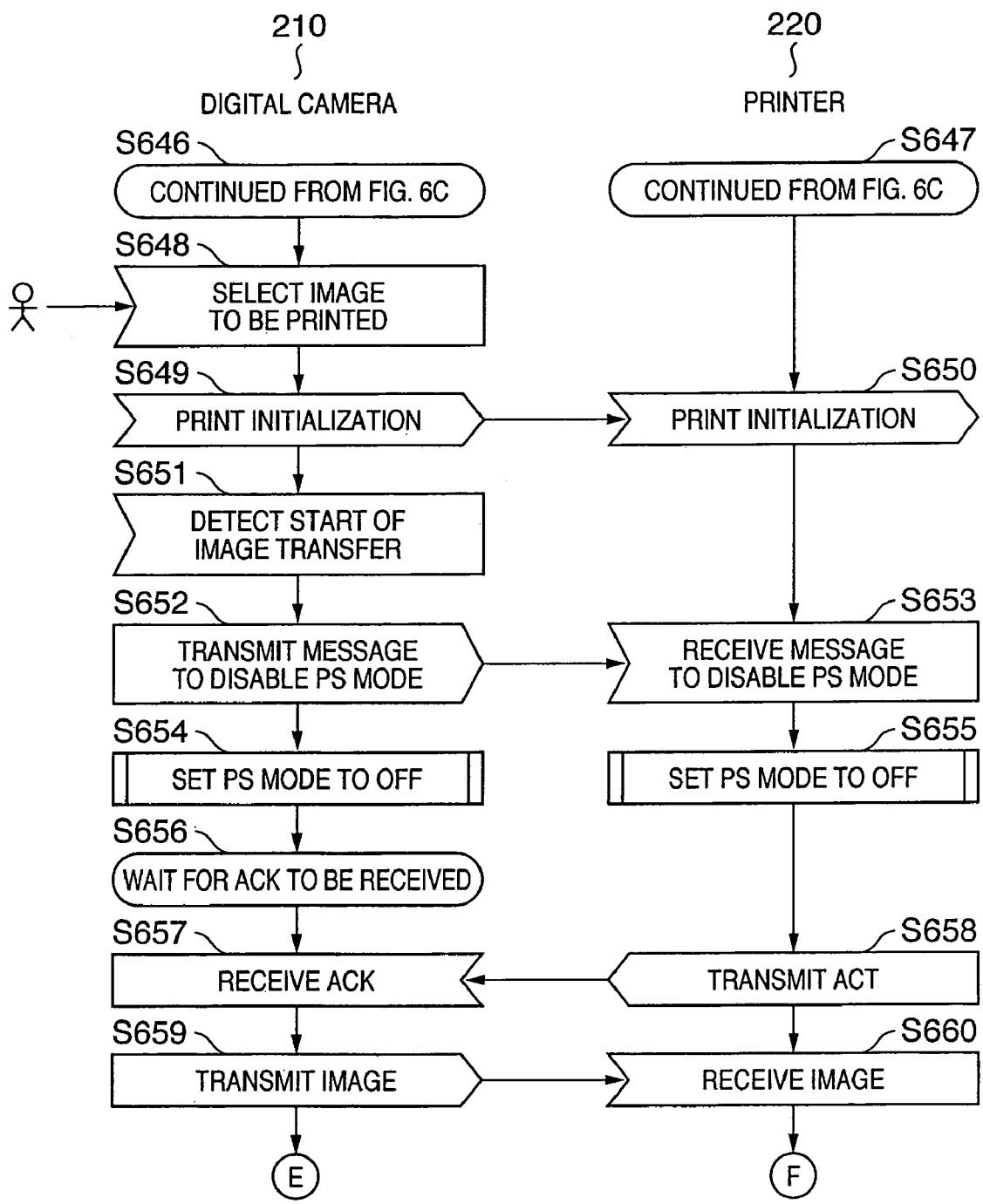

Moving to FIG. 6D, in step S648, the control unit 301 of the digital camera 210 waits for a print instruction to be received from the user through the operation unit 306. The print instruction includes image data to be printed and information indicating the number of sheets to be printed, the size of sheet, etc. (hereinafter referred to as "print parameters").

In step S649, the control unit 301 of the digital camera 210 transmits the print parameters to the printer 220. In step S650, the control unit 401 of the printer 220 receives the print parameters from the digital camera 210 and initializes (prepares) the printer 220 for printing.

In step S651, the control unit 301 of the digital camera 210 detects that image data is about to be transferred.

In step S652, the control unit 301 of the digital camera 210 transmits a message to disable PS mode to the printer 220.

In step S653, the control unit 401 of the printer 220 receives the message to disable PS mode from the digital camera 210.

In step S654, the control unit 301 of the digital camera 210 disables the PS mode of the digital camera 210.

In step S655, the control unit 401 of the printer 220 disables the PS mode of the printer 220. Then, in step S658, the control unit 401 of the printer 220 transmits an ACK packet to the digital camera 210.

The reason for disabling PS mode here is as follows: When PS mode is enabled, if a data packet to be transmitted immediately after an ATIM Window period is generated, the digital camera 210 has to wait until the ATIM Window of the next beacon interval. This leads to reduction in data transmission rate (throughput). Accordingly, if the size of data transmitted and received between the digital camera 210 and the printer 220 is larger than a predetermined size, it is preferred to disable PS mode. If the reduction in the throughput does not matter, however, PS mode need not be disabled.

In step S656, the control unit 301 of the digital camera 210 waits for the ACK packet to be received from the printer 220. When the ACK packet is received, the process proceeds to steps S657 and S659.

In step S659, the control unit 301 of the digital camera 210 transmits the image data to the printer 220 according to the print parameters. In general, the image data is recorded in a memory card (not shown) of the digital camera 210.

In step S660, the control unit 401 of the printer 220 receives the image data from the digital camera 210. Then the process proceeds to step S661 in FIG. 6E.

Figure 6E:
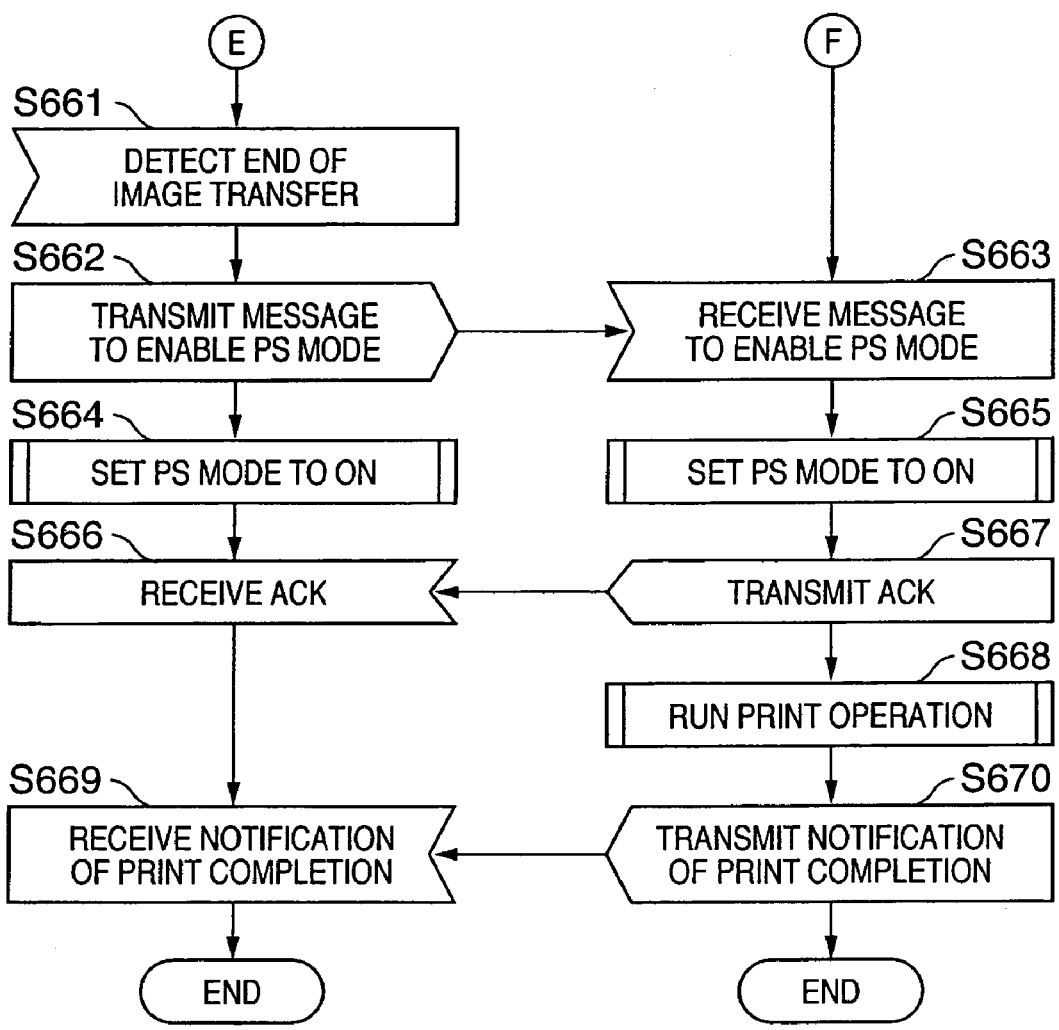

In step S661 in FIG. 6E, the control unit 301 of the digital camera 210 detects that the transmission of the image data is complete.

In step S662, the control unit 301 of the digital camera 210 transmits a message to enable PS mode to printer 220.

In step S663, the control unit 401 of the printer 220 receives the message to enable PS mode from the digital camera 210.

In step S664, the control unit 301 of the digital camera 210 enables the PS mode of the digital camera 210.

In step S665, the control unit 401 of the printer 220 enables the PS mode of the printer 220. Then, in step S667, the control unit 401 of the printer 220 transmits an ACK packet to the digital camera 210.

In step S666, the control unit 301 of the digital camera 210 waits for the ACK packet to be received from the printer 220. When the ACK packet is received, the process proceeds to step S669.

In step S668, the control unit 401 of the printer 220 performs a print operation according to the print parameters using the print unit 407. It should be noted that the print operation may also be executed immediately after the start of reception of the image data in step S660.

In step S670, the control unit 401 of the printer 220 transmits a message to indicate completion of printing to the digital camera 210, and the process ends.

In step S669, the control unit 301 of the digital camera 210 receives the message to indicate completion of printing from the printer 220, and the process ends.

As described above, according to the present embodiment, the digital camera 210 and the printer 220 mutually determine if each other supports PS mode. If they do, these two apparatuses can form a network for PS by themselves, and transmit and receive data with PS mode enabled. Also, in the network for PS, when a large amount of data is transmitted and received, the PS mode of the digital camera 210 and the printer 220 may be disabled. According to this the following advantages can be obtained.

First, even when the PS mode of an STA is enabled, the STA may be prevented from failing to receive packets transmitted from the network to which the STA belongs. This is because the network to which the STA belongs, i.e. the network for PS, only includes wireless communication apparatuses that support PS mode, and is also because the PS mode of the STA is disabled in the initial network in which it is included before shifting to the network for PS.

Second, even if the PS mode of an STA is enabled, because it can be switched to disabled depending on the amount of data transmitted and received, reduction in throughput can be prevented.

Third, consumption of resources such as a memory or a CPU can be restricted. Previously, for communicating with PS mode enabled in an adhoc network, the PS mode of each of the STAs must have been kept track of. Therefore, each of the STAs must have performed operations such as detecting the status of PM bits contained in packets such as beacons transmitted from the other STAs, storing the results for each MAC address of the STAs, and updating the results whenever necessary upon receipt of a packet. This poses a problem that resources such as a memory or a CPU are excessively consumed. In this embodiment, however, since the network for PS is comprised of only two apparatuses which transmit and receive data, the above described operations which consume additional memory or CPU are eliminated.

Second Embodiment

In the first embodiment, when the digital camera 210 and the printer 220 wirelessly communicate with each other with PS mode enabled, the wireless parameters are changed so that the digital camera 210 and the printer 220 can form an network for PS in which no other wireless apparatus is present. In a second embodiment, of the wireless parameters of the digital camera 210 and the printer 220, only the encryption key is changed to form a network for PS.

Since this embodiment does not include a procedure to once disconnect the digital camera 210 and the printer 220 from the initial network and reconnect them to the network for PS as in the first embodiment, there is an advantage that the network can be switched more quickly.

It should be noted that the configurations of the digital camera 210 and the printer 220 may be the same as those in the first embodiment and so the description of them is omitted here (see FIGS. 3 and 4).

<Outline of Network>

Figure 7:
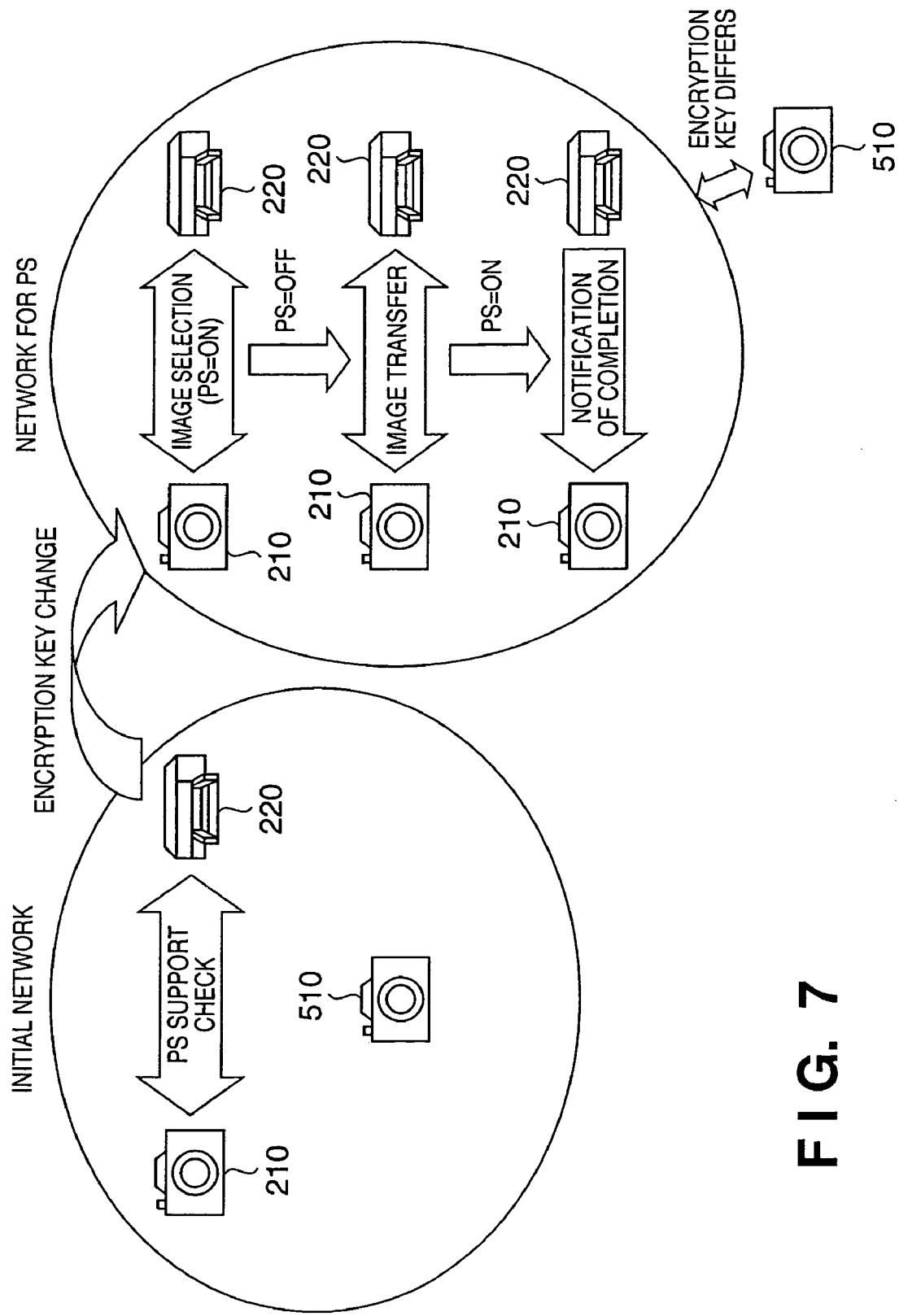
FIG. 7 illustrates an outline of an adhoc network in a second embodiment.

FIG. 7 illustrates an outline of an adhoc network in this embodiment. As in the first embodiment, the initial adhoc network (initial network) including the digital camera 210 and the printer 220 may include other wireless communication apparatuses such as a digital camera 510. The digital camera 510 may or may not support PS mode.

Next, once the digital camera 210 and the printer 220 mutually make sure that each other supports PS mode, they only change the encryption key of their wireless parameters without disconnecting from the initial network. The network which includes the digital camera 210 and the printer 220 with the changed encryption key is called a network for PS. Unlike the first embodiment, in the network for PS other wireless communication apparatuses such as the digital camera 510 may exist. However, because of the different encryption key, in the network for PS, data can actually be transmitted and received between the digital camera 210 and the printer 220 only. Accordingly, the network for PS in the first embodiment and the network for PS in the second embodiment substantially have the same advantages.

In the network for PS, the digital camera 210 and the printer 220 can arbitrarily enable or disable PS mode. As in the first embodiment, it is preferable that PS mode is enabled in principle and is disabled when a large amount of data such as image data is transmitted and received.

<Flow of Processing>

FIGS. 8A to 8E are flow charts illustrating the flows of processing in which the digital camera 210 and the printer 220 form a network for PS and transmit and receive data. In these flow charts, the operations performed by the digital camera 210 and the printer 220 are provided in parallel.

It should be noted that, in FIGS. 8A to 8E, the same reference numerals are used to designate the steps where the same operations as in FIGS. 6A to 6E are performed, the description of which is omitted here.

In these flow charts, the description is given based on an assumption that the digital camera 210 transmits image data to the printer 220, and the printer 220 performs so-called direct print. However, the types of data actually transmitted and received are not limited to this, and what is important is that the digital camera 210 and the printer 220 wirelessly communicate with PS mode enabled, as appropriate.

Figure 8A:
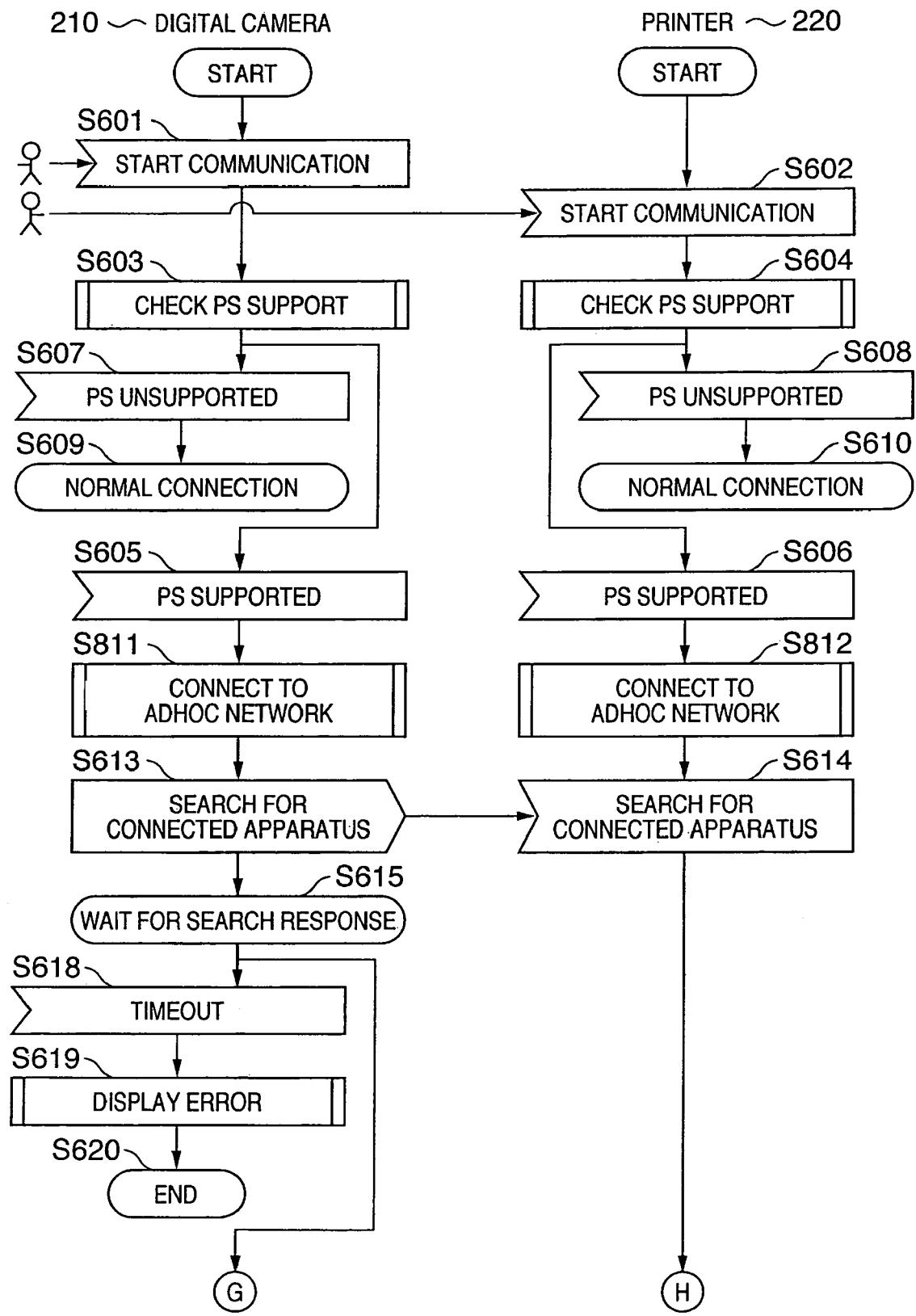
FIGS. 8A to 8E are flow charts illustrating the flows of processing in which the digital camera and the printer form a network for PS and transmit and receive data in the second embodiment.

In step S811 in FIG. 8A, the control unit 301 of the digital camera 210 connects to an adhoc network (initial network) using wireless parameters recorded in the storage unit 305. At this time, ATIM Window is set to a value of 1 or above, and the PS mode of the digital camera 210 is disabled. Even if there are some other wireless communication apparatuses in the initial network which do not support PS mode, this can prevent the digital camera 210 from failing to receive packets transmitted from those apparatuses.

In step S812, the control unit 401 of the printer 220 connects to the initial network using wireless parameters recorded in the storage unit 405. At this time, ATIM Window is set to a value of 1 or above and the PS mode of the printer 220 is disabled. This has the same effect as in step S811.

The reason for setting the value 1 or above to the ATIM Window here, unlike the first embodiment, is as follows: The value for ATIM Window can be set only when the digital camera 210 and the printer 220 establish connection to the adhoc network, but it cannot be changed during the connection. Since this embodiment does not perform the operation to disconnect the digital camera 210 and the printer 220 once from the initial network and then reconnect them to the network for PS, if ATIM Window=0 is initially set, PS mode cannot be enabled.

Figure 8B:
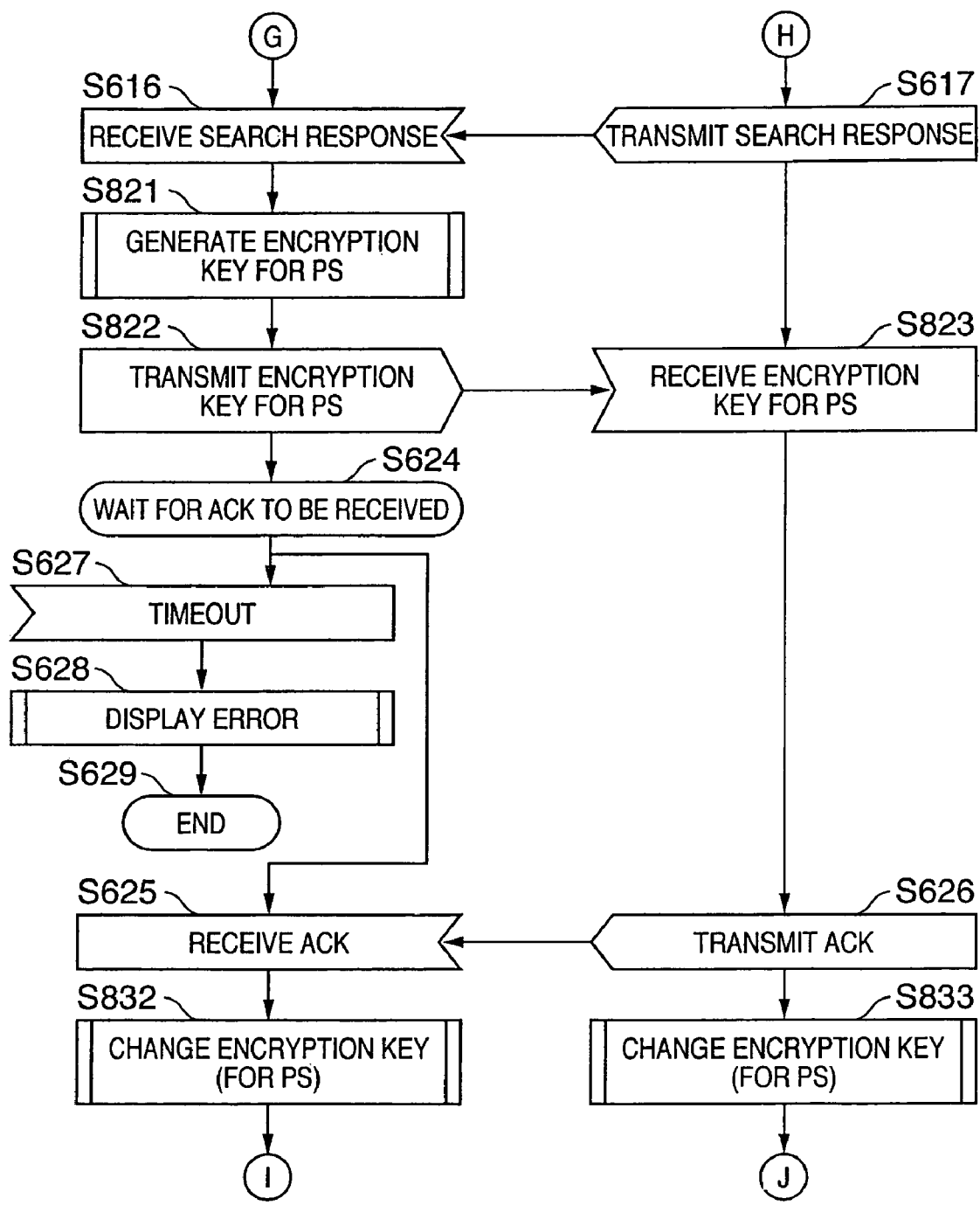
Figure 8C:
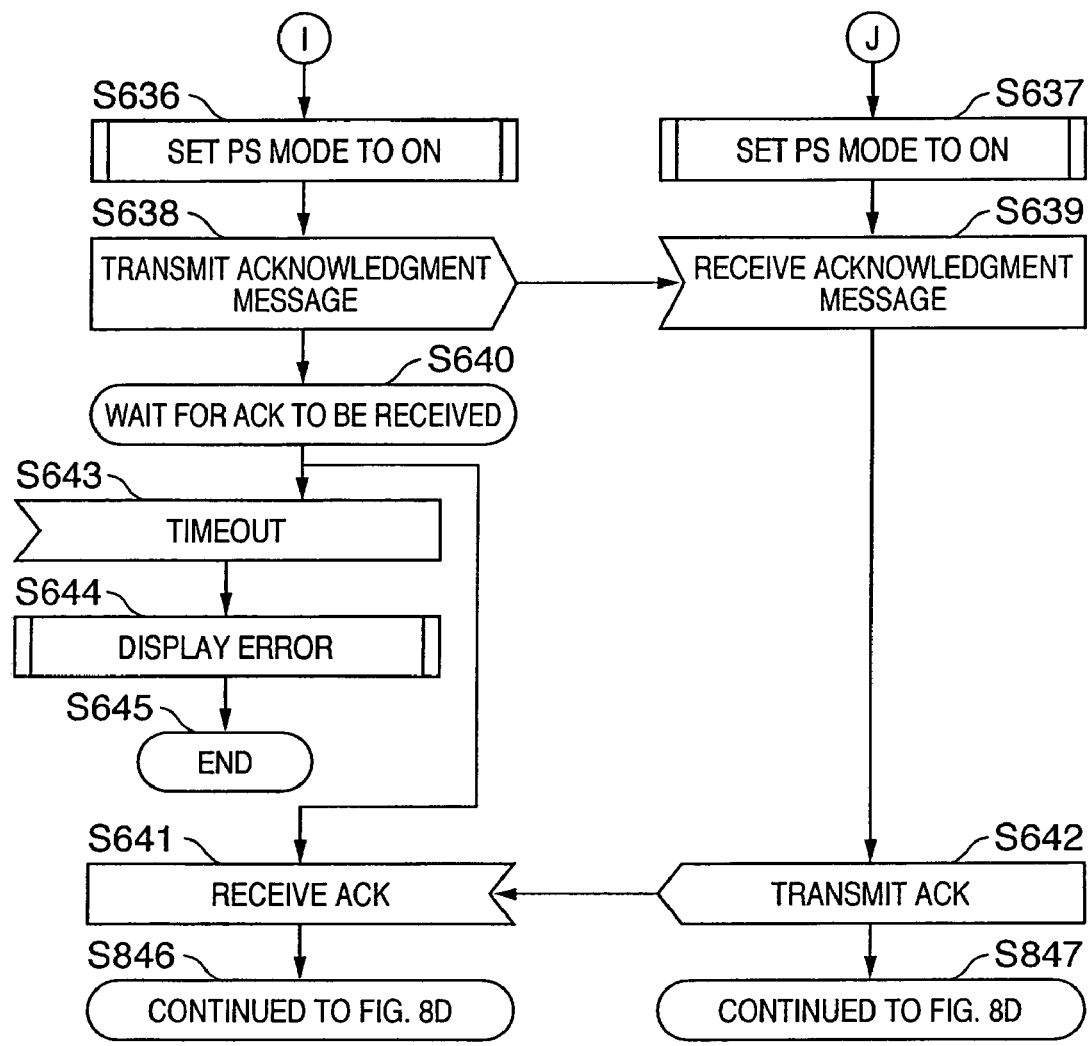
Figure 8D:
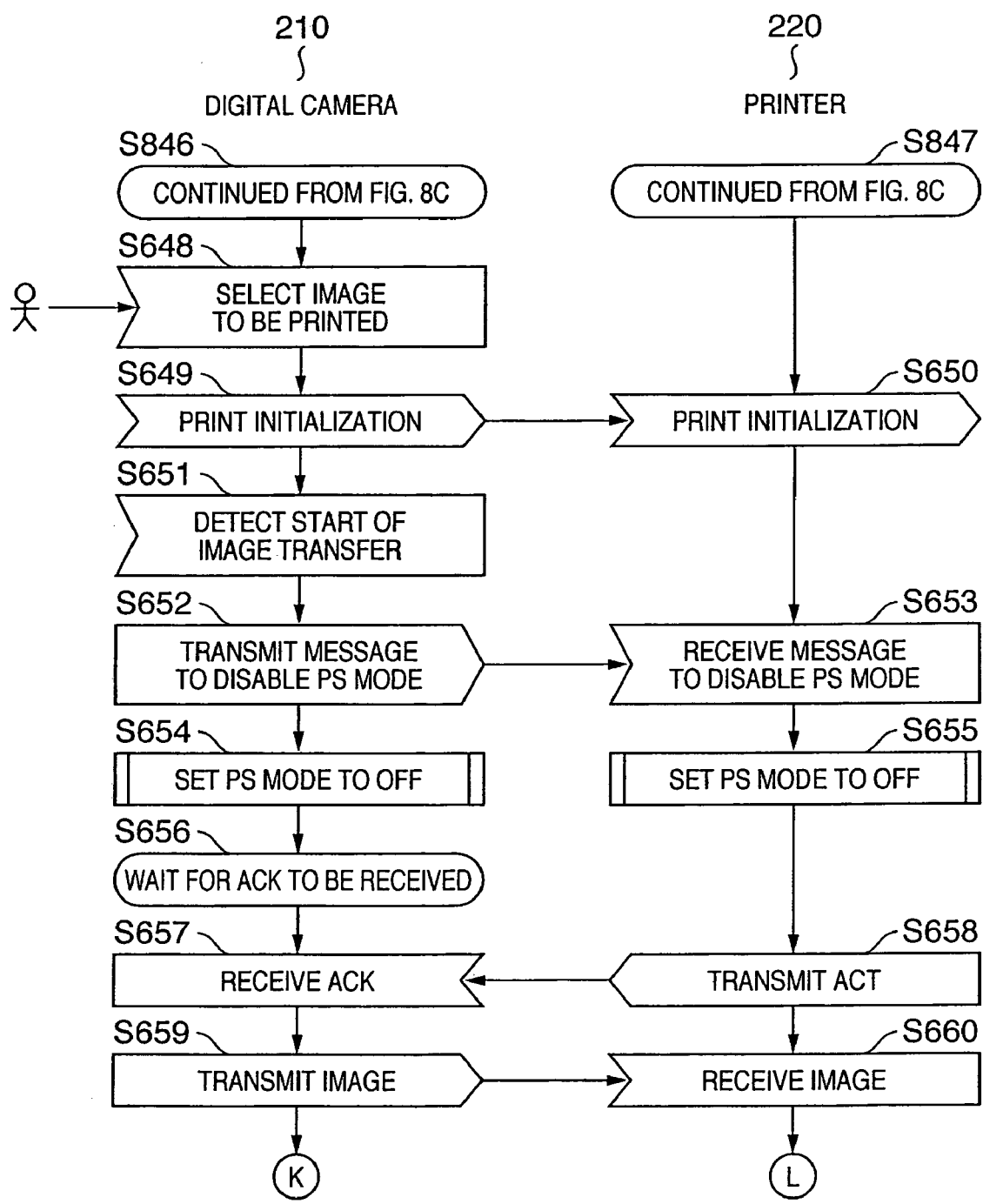
Figure 8E:
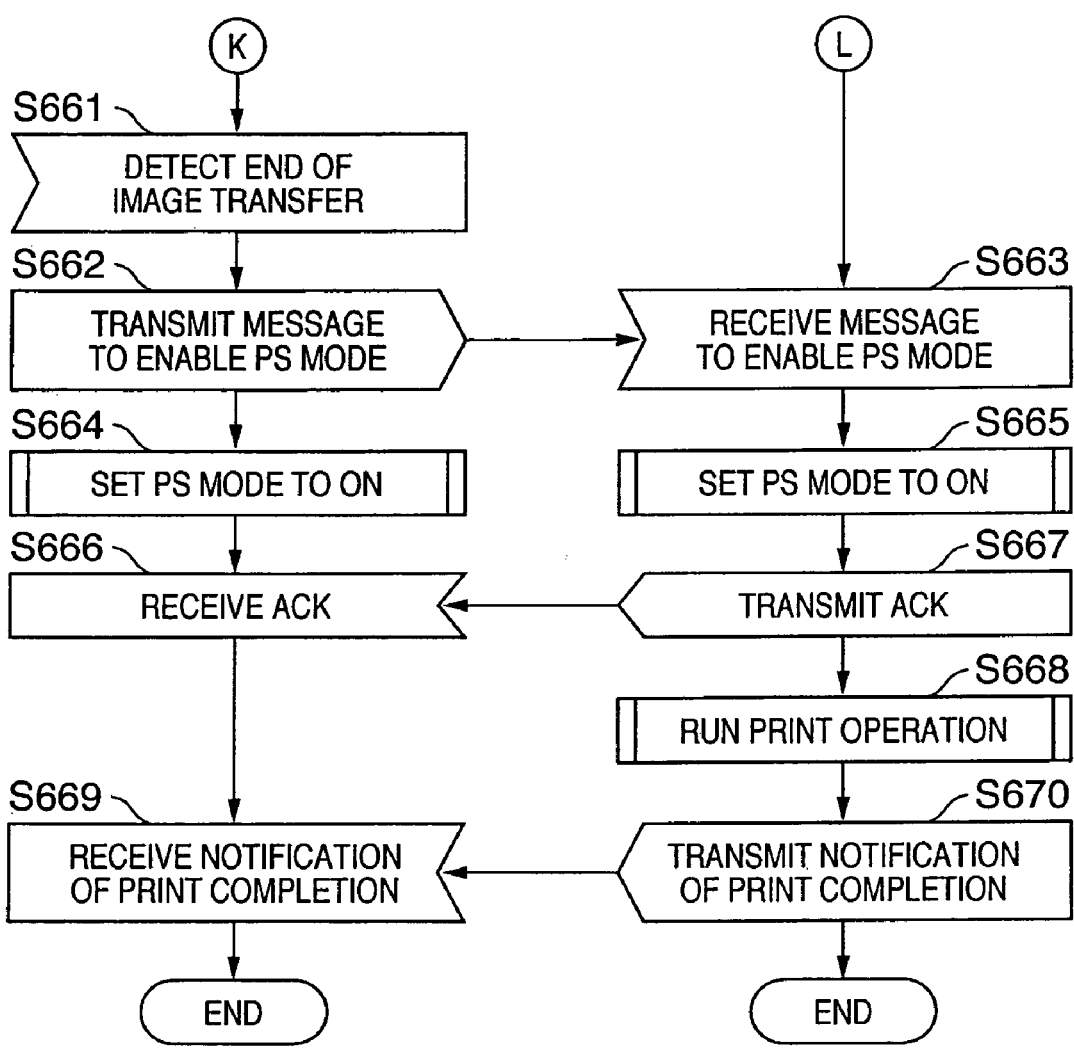

In step S821 in FIG. 8B, the control unit 301 of the digital camera 210 generates an encryption key for the network for PS (FIG. 7). The generated encryption key is recorded, for example, in the storage unit 305. The encryption key is generated randomly using, for example, a product ID or a serial number of the digital camera 210, or a current time as a seed. It should be noted that any algorithm may be used for the generation algorithm of the encryption key if only it can create a unique value. Alternatively, the printer 220, instead of the digital camera 210, may also be configured to generate the encryption key.

In step S822, the control unit 301 of the digital camera 210 transmits the encryption key generated in step S821 to the printer 220.

In step S823, the control unit 401 of the printer 220 receives the encryption key transmitted from the digital camera 210. The received encryption key is recorded, for example, in the storage unit 405. Then, in step S626, the control unit 401 of the printer 220 transmits an ACK packet to the digital camera 210.

In step S832, the control unit 301 of the digital camera 210 changes the encryption key used by the digital camera 210 to that generated in step S821.

In step S833, the control unit 401 of the printer 220 changes the encryption key used by the printer 220 to that received in step S823.

According to the above described processing, the digital camera 210 and the printer 220 are disabled from communicating with the other wireless communication apparatuses (such as the digital camera 510) present in the initial network and substantially disconnected from the initial network. This can prevent the initial network or the network for PS from being adversely affected even if the other wireless communication apparatuses transmit packets to the digital camera 210 or the printer 220 when it is in the Doze state.

As described above, according to the present embodiment, the digital camera 210 and the printer 220 mutually determine if each other supports PS mode. If they do, these two apparatuses can form a network for PS by themselves, and transmit and receive data with PS mode enabled. However, the network for PS, unlike the first embodiment, is formed by changing only the encryption key of the wireless parameters.

In addition to the advantages in the first embodiment, this allows for forming the network for PS faster because it requires changing only the encryption key without going through the procedure to disconnect the digital camera 210 and the printer 220 once from the initial network and then reconnect to the network for PS.

Other Embodiment

The processing of the above described embodiments may also be achieved by providing a system or an apparatus with a storage medium recording program code of software embodying the functions. Then, the functions of the above described embodiments can be realized by a computer (or a CPU or an MPU) of the system or the apparatus reading and executing the program code stored in the storage medium. In this case, it is deemed that the program code read out from the storage medium as such realizes the functions of the above described embodiments, and that the storage medium recording the program code constitutes the present invention. For the storage medium for providing such program code, for example, floppy (registered trademark) disks, hard disks, optical disks, magneto-optical disks, etc. are used. Alternatively, CD-ROMs, CD-Rs, magnetic tapes, non-volatile memory cards, ROMs, etc. may also be used.

The functions of the above described embodiments may be achieved not only by executing the program code read out by the computer. As an alternative, the OS (operating system) running on the computer may perform some or all of the actual processing based on the instructions of the program code, and the functions of the above described embodiments may be achieved by the processing.

As another alternative, the program code read out from the storage medium may also be written into a memory provided in an extension board inserted into the computer or an extension unit connected to the computer. Then, a CPU or the like provided in the extension board or the extension unit may perform some or all of the actual processing based on the instructions of the program code, and the functions of the above described may be achieved by the processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-264425, filed on Sep. 12, 2005, which is hereby incorporated by reference herein in its entirety.

What is claimed is:

1. A communication apparatus capable of wirelessly communicating in power save mode, comprising:
   a first connection unit for connecting to a first network using first wireless parameters,
   a detection unit for detecting whether or not a predetermined external apparatus included in the first network supports wireless communication in the power save mode,
   a transmission unit for transmitting to the external apparatus second wireless parameters for connecting to a second network different from the first network being comprised of the external apparatus and the communication apparatus and a network switching request to connect to the second network using the second wireless parameters, if it is detected by the detection unit that the external apparatus supports wireless communication in the power save mode, and
   a second connection unit for connecting to the second network instead of the first network using the second wireless parameters,
   wherein the communication apparatus wirelessly communicates in the power save mode with the external apparatus in the second network.

2. The communication apparatus according to claim 1, wherein the first wireless parameters and the second wireless parameters include an ESS-ID and an encryption key.

3. The communication apparatus according to claim 1, wherein the power save mode is not used in the second network while data larger than a predetermined size is transmitted and received between the external apparatus and the communication apparatus.

4. The communication apparatus according to claim 1, wherein the size of ATIM Window is set to 0 when connecting to the first network and the size of ATIM Window is set to 1 or above when connecting to the second network.

5. The communication apparatus according to claim 1, further comprising a generation unit for generating the second wireless parameters.

6. The communication apparatus according to claim 1, further comprising an encryption key changing unit for changing an encryption key to use to a second encryption key different from an encryption key being used in the first network,
   wherein the transmission unit transmits to the external apparatus the second encryption key and an encryption key changing request to change the encryption key to use to the second encryption key instead of the second wireless parameters and the network switching request,
   wherein the communication apparatus wirelessly communicates with the external apparatus in the power save mode using the second encryption key.

7. The communication apparatus according to claim 6, wherein the power save mode is not used in the second network while data larger than a predetermined size is transmitted and received between the external apparatus and the communication apparatus using the second encryption key.

8. The communication apparatus according to claim 6, wherein the size of ATIM Window is set to 1 or above when connecting to the first network.

9. The communication apparatus according to claim 6, further comprising a generation unit for generating the second encryption key.

10. The communication apparatus according to claim 1, further comprising a storage unit for storing the first wireless parameters and information indicating whether or not the external apparatus supports wireless communication in the power save mode,
    wherein the connection unit obtains, from the storage unit, the first wireless parameters to connect to the first network,
    wherein the detection unit obtains, from the storage unit, the information indicating whether or not the external apparatus supports wireless communication in the power save mode to perform the detection.

11. A method for controlling a communication apparatus capable of wirelessly communicating in power save mode, comprising:
    a first connection step of connecting to a first network using first wireless parameters,
    a detection step of detecting whether or not a predetermined external apparatus included in the first network supports wireless communication in the power save mode,
    a transmission step for transmitting to the external apparatus second wireless parameters for connecting to a second network different from the first network being comprised of the external apparatus and the communication apparatus and a network switching request to connect to the second network using the second wireless parameters, if it is detected in the detection step that the external apparatus supports wireless communication in the power save mode,
    a second connection step for connecting to the second network instead of the first network using the second wireless parameters, and
    a communication step of wirelessly communicating in the power save mode with the external apparatus in the second network.

12. A program, stored in a computer-readable storage medium, for causing a computer to execute a method for controlling a communication apparatus capable of wirelessly communicating in power save mode, comprising:

a first connection step of connecting to a first network using first wireless parameters, a detection step of detecting whether or not a predetermined external apparatus included in the first network supports wireless communication in the power save mode, a transmission step for transmitting to the external apparatus second wireless parameters for connecting to a second network different from the first network being comprised of the external apparatus and the communication apparatus and a network switching request to connect to the second network using the second wireless parameters, if it is detected in the detection step that the external apparatus supports wireless communication in the power save mode, a second connection step for connecting to the second network instead of the first network using the second wireless parameters, and a communication step of wirelessly communicating in the power save mode with the external apparatus in the second network.

13. A computer-readable storage medium recording a program according to claim 12.

* * * * *